(12) United States Patent
Mukai (10) Patent No.: US 8,421,388 B2
(45) Date of Patent: Apr. 16, 2013

(54) MULTI-PHASE ROTARY MACHINE CONTROL APPARATUS AND ELECTRIC POWER STEERING SYSTEM USING THE SAME

(75) Inventor: Yasuhiko Mukai, Anjo (JP)

(73) Assignee: Denso Corporation, Kariya (JP)

( * ) Notice: Subject to any disclaimer, the term of this patent is extended or adjusted under 35 U.S.C. 154(b) by 304 days.

(21) Appl. No.: 12/877,293

(22) Filed: Sep. 8, 2010

(65) Prior Publication Data
US 2011/0074323 A1    Mar. 31, 2011

(30) Foreign Application Priority Data

Sep. 30, 2009  (JP) ................. 2009-227684

(51) Int. Cl.
*H02H 7/08* (2006.01)

(52) U.S. Cl.
USPC ............ 318/400.21; 318/400.01; 318/400.16; 318/400.19; 318/700

(58) Field of Classification Search ............ 318/400.21, 318/400.01, 700, 400.16, 400.19
See application file for complete search history.

(56) References Cited

U.S. PATENT DOCUMENTS

| | | | | |
|---|---|---|---|---|
| 5,414,339 | A * | 5/1995 | Masaki et al. | 318/800 |
| 7,439,697 | B2 * | 10/2008 | Miyazaki et al. | 318/400.41 |
| 7,504,790 | B2 * | 3/2009 | Tsuji et al. | 318/432 |
| 2008/0067960 | A1 * | 3/2008 | Maeda et al. | 318/400.02 |
| 2010/0017063 | A1 | 1/2010 | Maeda | |

FOREIGN PATENT DOCUMENTS

| | | |
|---|---|---|
| JP | 6-98596 | 4/1994 |
| JP | 3259805 | 12/2001 |
| JP | 2002-058288 | 2/2002 |
| JP | 2005-304119 | 10/2005 |
| JP | 2006-050709 | 2/2006 |

OTHER PUBLICATIONS

Japanese Office Action dated Aug. 23, 2011, issued in corresponding Japanese Application No. 2009-227684 with English Translation.

* cited by examiner

*Primary Examiner* — Walter Benson
*Assistant Examiner* — David Luo
(74) *Attorney, Agent, or Firm* — Nixon & Vanderhye P.C.

(57) ABSTRACT

A failure identification part identifies a switching element pair having off-failure, in which a FET of the switching element pair in a first inverter part is disabled to turn on. A failure-time control part controls other switching element pairs and of the first inverter part based on failure-time phase current command values calculated as a function of a rotation position and a q-axis current command value. The failure-time control part controls a second inverter part normally. A motor is persistently driven with the minimum reduction in motor torque, even when the FET fails.

4 Claims, 6 Drawing Sheets

FIG. 4A (NORMAL)

FIG. 4B (OFF-FAILURE)

MULTI-PHASE ROTARY MACHINE CONTROL APPARATUS AND ELECTRIC POWER STEERING SYSTEM USING THE SAME

CROSS REFERENCE TO RELATED APPLICATION

This application is based on and incorporates herein by reference Japanese patent application No. 2009-227684 filed on Sep. 30, 2009.

FIELD OF THE INVENTION

The present invention relates to a multi-phase rotary machine control apparatus and an electric power steering system using the same.

BACKGROUND OF THE INVENTION

A conventional a multi-phase rotary machine control apparatus controls a multi-phase rotary machine by switching on and off a plurality of switching elements. It is proposed by the following patent documents to drive a rotary machine to maintain its rotation even if a part of a plurality of switching elements fails.

Patent document 1: JP 2005-304119A
Patent document 2: JP 6-98596A
Patent document 3: JP 2009-6963A (US 2010/0017063 A1)

According to patent document 1, a plurality of electric power supply sources such as inverters is provided. If any one of the power supply sources fails to operate normally, the power supply from such a failing power supply source to a group of a plurality of coils corresponding to the failing power supply source is stopped. The power supply sources, which are other than the failing power supply source and operating normally, are controlled to supply electric power to such a group of coils corresponding to the failing power supply source. However, the amount of electric power supplied to the rotary machine will be reduced by an amount, which the failing power supply source has supplied normally. If the electric power of the other normal power supply sources is increased to compensate the electric power for the reduction, the switching elements of the normal power supply sources generate more heat. Thus, the period, in which the normal power supply sources are allowed to output increased power for compensation, is limited to be short.

According to patent document 2, a target value of an armature current of each phase of an electric motor is calculated as a function of an inverse-proportion value and a direct proportion value. The inverse proportion value is inversely proportional to a sum of squares of instant values of induced voltages of all phases. The direct proportion value is directly proportional to an instant value of an induced voltage of each phase. The armature current of each phase is controlled in accordance with the calculated target value. In a single-phase inverter system, a current is supplied to each coil independently from other coils. A phase current command value is therefore readily calculated in inverse proportion to a sum of squares of induced voltages. In a three-phase inverter system for a three-phase motor for example, currents Iu, Iv and Iw supplied to phases U, V and W, respectively, are restricted to satisfy Iu+Iv+Iw=0. Under this restriction, the phase current command values need be calculated in inverse proportion to a sum of squares of induced voltages. If an off-failure arises in one of phases, for example U-phase, under the restriction and hence no current Iu is supplied, other phase currents Iv and Iw are restricted to satisfy Iv=−Iw. As a result, no torque is generated in some periods.

According to patent document 3, if an off-failure arises in one phase of a three-phase inverter system, phase current command values for the other two phases are calculated to satisfy Iu+Iv+Iw=0. The phase current command values are calculated by referring to a data table, which stores predetermined data as a function of an angular position of a rotor. If the off-failure arises, the same problem arises as in the patent document 2. Further, a memory of a large capacity is required to store the phase current command values as a data table to be referred to in case one of the three phases of the three-phase inverter system fails.

SUMMARY OF THE INVENTION

It is therefore an object of the present invention to minimize reduction of output power of an inverter even if a failure arises in a switching element.

According to the present invention, a control apparatus is provided for a multi-phase rotary machine, which includes a stator, a rotor and a shaft. The stator is wound with a plurality of coil sets each including coils of a plurality of phases. The rotor is rotatable relative to the stator and the shaft is rotatable with the rotor. The control apparatus comprises a plurality of inverter parts, a rotation position detection part, a current detection part and a control part. The inverter parts are provided in correspondence to the plurality of coil sets. Each inverter part includes a plurality of switching parts in correspondence to each coil set. The rotation position detection part detects a rotation position of the rotor. The current detection part detects a current supplied to each of the coils. The control part turns on and off the switching parts thereby to control each current supplied to the coils. The control part includes a failure identification part for identifying a failing switching part, which has an off-failure, when the switching part is disabled to turn on. The control part includes a failure-time control part for controlling, in a failing inverter part including the failing switching part, other switching parts different from the failing switching part based on a failure-time phase current command value calculated as a function of the rotation position and a torque command value or a function of the rotation position and a q-axis current command value.

The failure-time control part may perform a normal control or a failure-time control for a normal inverter part other than the failing inverter part. In the failure-time control, the failure-time control part calculates a torque difference and controls the normal inverter part by correcting a q-axis current command value of the normal inverter part based on the torque difference. The failure-time control part calculates the torque difference from a normal torque generated when the switching part has no failure and the normal control is performed and a failure-time torque generated when the switching part has the off-failure. The failure-time control is performed based on the calculated failure-time current command value.

BRIEF DESCRIPTION OF THE DRAWINGS

The foregoing and other objects, features and advantages of the present invention will become more apparent from the following detailed description made with reference to the accompanying drawings. In the drawings.

DETAILED DESCRIPTION OF THE PREFERRED EMBODIMENT

The present invention will be described in detail with reference to various embodiments, in which the same or similar parts are denoted by the same or similar reference numerals.

First Embodiment

Figure 1:
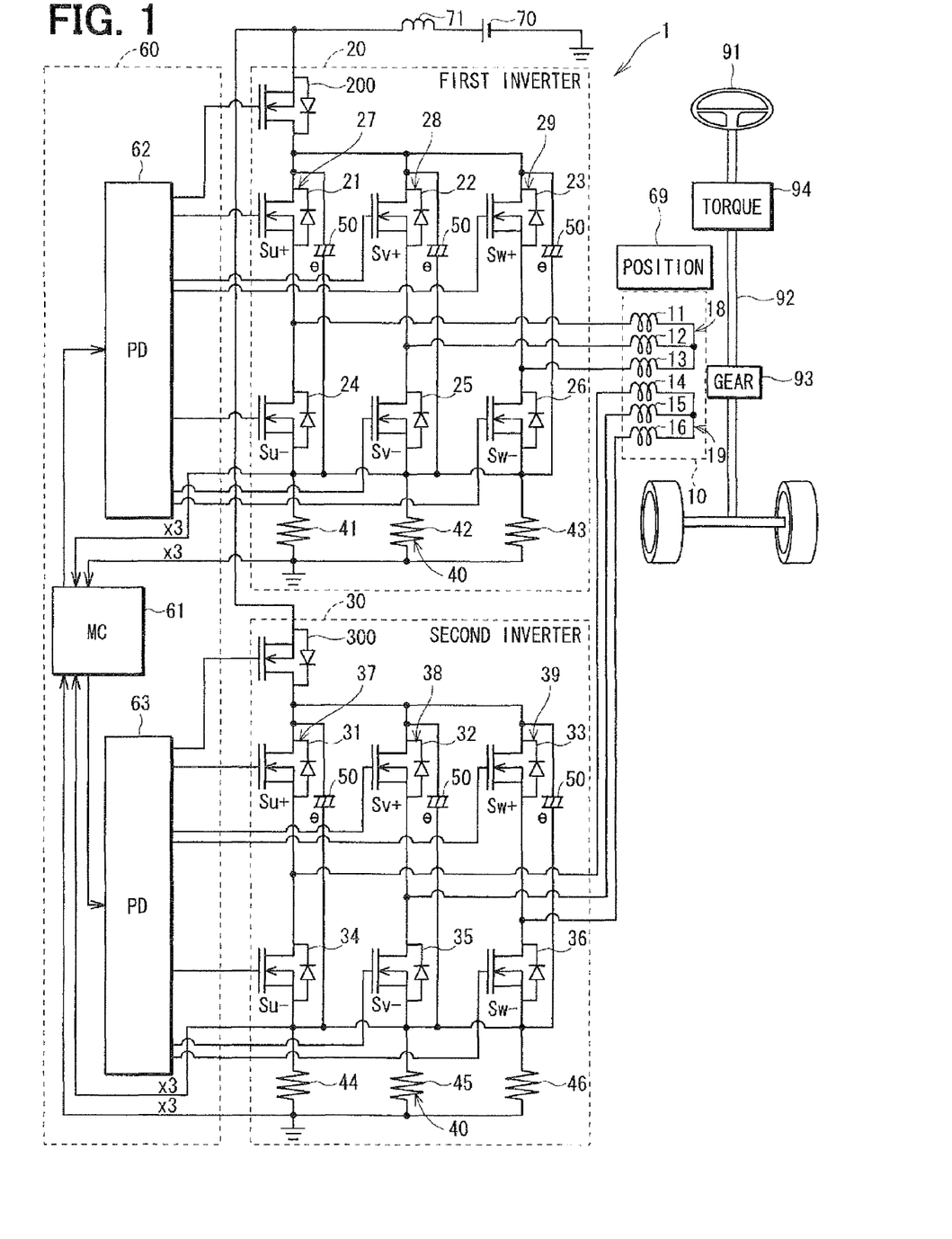
FIG. 1 is a circuit diagram showing an electric power steering system using a multi-phase motor control apparatus according to a first embodiment of the present invention.

Referring first to FIG. 1, a multi-phase motor control apparatus 1 is provided for controlling the operation of a multi-phase electric motor 10, which is a rotary machine. The motor 10 is used in an electric power steering system (EPS) for power-assisting the steering operation of a vehicle. The motor 10 drives a column shaft 92, which is a rotation shaft of a steering wheel 91 of the vehicle, through a gear 93 to generate a rotation torque so that the steering operation of the steering wheel 91 is assisted. More specifically, when the steering wheel 91 is operated by a driver of the vehicle, a steering torque generated by the column shaft 92 is detected by a torque sensor 94. A vehicle speed is detected by a speed sensor (not shown) and acquired through a controller-area-network (CAN, not shown). The motor 10 is controlled in accordance with the detected torque and the detected vehicle speed.

The motor 10 is a three-phase brushless motor, which drives the gear 93 in the forward and reverse directions. The motor 10 is made up of, although not shown in detail, a stator, a rotor and a shaft. The rotor is a cylindrical body, which rotates with the shaft. Permanent magnets are fixed on the peripheral surface to provide magnetic poles. The stator accommodates and rotatably supports the rotor therein. The stator has protrusions extending radially in the inner direction and spaced apart each other equi-angularly in the circumferential direction. On the protrusions, a U1 coil 11, a V1 coil 12, a W1 coil 13, a U2 coil 14, a V2 coil 15 and a W2 coil 16 are wound. The U1 coil 11, the V1 coil 12 and the W1 coil 13 form a first coil set 18. The U2 coil 14, the V2 coil 15 and the W2 coil 16 form, a second coil set 19. The motor 10 thus have a plurality of coil sets 18 and 19, each of which has three coils of three phases U, V and W connected in a star shape. A position sensor 69 is provided to detect a rotation position θ of the rotor. The position sensor 69 may be a resolver. The rotor position may be determined based on each phase voltage or current of the motor 10 in place of the position sensor 69.

The control apparatus 1 for the motor 10 includes a first inverter part 20, a second inverter part 30, current detection parts 40, capacitors 50 and a control pat 60 in addition to the position sensor 69 and a battery 70. The part 20 is a three-phase inverter, in which six switching elements 21 to 26 are connected in a bridge form thereby to turn on and off the current supply to each of the U1 coil 11, the V1 coil 12 and the W1 coil 13 of the first coil set 18. Each of the switching elements 21 to 26 is a metal-oxide-semiconductor field-effect transistor MOSFET). The switching elements 21 to 26 are referred to as FETs, respectively.

Three FETs 21 to 23 have respective drains, which are connected to a high potential side, that is, the power source 70 side. The FETs 21 to 23 have respective sources, which are connected to drains of the FETs 24 to 26. The FETs 24 to 26 have respective sources, which are grounded. The FETs 21 and 24 are connected in series as a first pair and the junction between the two FETs 21 and 24 is connected to one end of the U1 coil 11. The FETs 22 and 25 are connected in series as a second pair and the junction between the two FETs 22 and 25 is connected to one end of the V1 coil 12. The FETs 23 and 26 are connected in series as a third pair and the junction between the two FETs 23 and 26 is connected to one end of the W1 coil 13.

The part 30 is also a three-phase inverter, in which six switching elements 31 to 36 are connected in a bridge form thereby to turn on and off the current supply to each of the U2 coil 14, the V2 coil 15 and the W2 coil 16 of the second coil set 19. Each of the switching elements 31 to 36 is a metal-oxide-semiconductor field-effect transistor MOSFET). The switching elements 31 to 36 are referred to as FETs, respectively.

Three FETs 31 to 33 have respective drains, which are connected to a high potential side, that is, the power source 70 side. The FETs 31 to 33 have respective sources, which are connected to drains of the FETs 34 to 36. The FETs 34 to 36 have respective sources, which are grounded. The FETs 31 and 34 are connected in series as a first pair and the junction between the two FETs 31 and 34 is connected to one end of the U2 coil 14. The FETs 32 and 35 are connected in series as a second pair and the junction between the two FETs 32 and 35 is connected to one end of the V2 coil 15. The FETs 33 and 36 are connected in series as a third pair and the junction between the two FETs 33 and 36 is connected to one end of the W2 coil 16.

Each of the FETs 21 to 23 and 31 to 33 is referred to as a high-side FET. Each of the FETs 24 to 26 and 34 to 36 is referred to as a low-side FET. Each FET may also be referred to as U1 high-side FET 21, for example, in combination with the corresponding coil. The FETs 21 and 24 form a U1 switching element pair 27. The FETs 22 and 25 form a V1 switching element pair 28. The FETs 23 and 26 form a W1 switching element pair 29. The FETs 31 and 34 form a U2 switching element pair 37. The FETs 32 and 35 form a V2 switching element pair 38. The FETs 33 and 36 form a W2 switching element pair 39.

Figure 2:
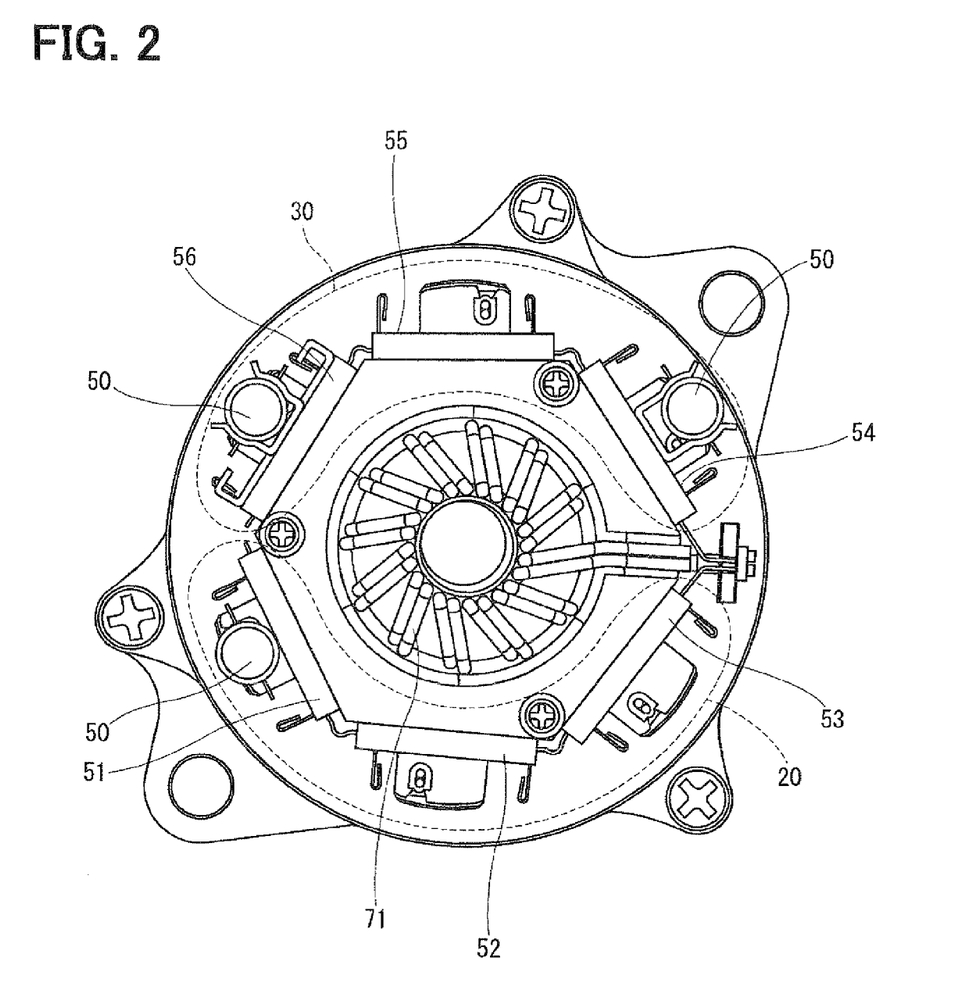
FIG. 2 is a plan view showing an electric motor used in the electric power steering system shown in FIG. 1.

The FETs 21 and 24 of the U1 switching element pair 27 are manufactured as semiconductor chips and resin-molded as one semiconductor module 51 as shown in FIG. 2. The FETs 22 and 25 of the V1 switching element pair 28 are manufactured as semiconductor chips and resin-molded as one semiconductor module 52 as shown in FIG. 2. The FETs 23 and 26 of the W1 switching element pair 29 are manufactured as semiconductor chips and resin-molded as one semiconductor module 53 as shown in FIG. 2. The FETs 31 and 34 of the U2 switching element pair 37 are manufactured as semiconductor chips and resin-molded as one semiconductor module 54 as shown in FIG. 2. The FETs 32 and 35 of the V2 switching element pair 38 are manufactured as semiconductor chips and resin-molded as one semiconductor module 55 as shown in FIG. 2. The FETs 33 and 36 of the W2 switching element pair 39 are manufactured as semiconductor chips and resin-molded as one semiconductor module 56 as shown in FIG. 2. FETs 200 and 300 (FIG. 1) are connected in reverse to the FETs 21 to 26 and 31 to 36 for protection from the reverse connection of the capacitors 50 or the like. The FET 200 is provided in the semiconductor module 53. The FET 300 is provided in the semiconductor module 54.

The current detection part includes a U1 current detection part 41, a V1 current detection part 42, a W1 current detection part 43, a U2 current detection part 44, a V2 current detection part 45 and a W2 current detection part 46. Each of the current detection parts is a shunt resistor. The detection part 41 is provided between the U1 low-side FET 24 and the ground. The detection part 42 is provided between the V1 low-side FET 25 and the ground. The detection part 43 is provided between the W1 low-side FET 26 and the ground. The detection part 44 is provided between the U2 low-side FET 34 and the ground. The detection part 45 is provided between the V2 low-side FET 35 and the ground. The detection part 46 is provided between the W2 low-side FET 36 and the ground. The AD values (A/D-converted values) of electric currents detected by the current detection parts 41 to 46 are acquired and stored in registers of the control part 60. All the AD values of the current detection parts 41 to 46 are acquired at the same time. At this moment, the rotation position θ of the rotor of the motor 10 detected by the position sensor 69 is also acquired.

Each capacitor 50 may be an aluminum electrolytic capacitor, which stores electric charge to supplement electric power supply to the FETs 21 to 26 and 31 to 36 and remove noise components in surge currents. The capacitors 50 are provided radially outside the semiconductor modules 51 to 56 as shown in FIG. 2, in which the capacitors 50 for the semiconductor modules 52, 53 and 55 are not shown. The capacitors 50 may alternatively be provided radially inside the semiconductor modules 51 to 56. A choke coil 71 is provided radially inside the semiconductor modules 51 to 56, which are located to be in generally a hexagonal shape, to reduce noise from the electric power supplied from the battery 70.

The control part 60 is configured to control overall operation of the control apparatus 1 and includes a microcomputer (MC) 61, pre-drivers (PD) 62, 63 and registers (not shown). In the control part 60, the microcomputer 61 controls electric currents supplied to the coils 11 to 16 by turning on and off the FETs 21 to 26 and 31 to 36 based on the AD values of the currents detected by the current detection part 40 and the rotation position θ of the rotor detected by the position sensor 69.

The FETs 21 to 26 and 31 to 36 are PWM-controlled in the following manner, if there arises no failure in the FETs 21 to 26 and 31 to 36. Because the PWM-control processing for the first inverter part 20 and the second inverter part 30 are basically the same, the PWM-control processing for the first inverter part 20 is described below as an example. Three-phase current values Iu1, Iv1 and Iw1 of the U1 coil 11, V1 coil 12 and W1 coil 13 are calculated based on the AD values of currents detected by the current detection parts 41 to 43, respectively. A d-axis current detection value Id1 and a q-axis current detection value Iq1 are calculated based on the calculated three-phase currents Iu1, Iv1 and Iw1 and the rotor rotation position detected by the position sensor 69. Here, the d-axis is the same as the direction of magnetic flux and the q-axis is an axis orthogonal to the magnetic flux. The q-axis current is a current component, which is proportional to a torque generated by the motor 10.

A d-axis command voltage value Vd1 and a q-axis command voltage value Vq1 are calculated by performing a current feedback control in accordance with a d-axis current command value Id*1, a q-axis current command value Iq*1, the d-axis current detection value Id1 and the q-axis current detection value Iq1.

In the current feedback control, a current difference ΔId1 between the d-axis value Id*1 and the d-axis value Id1 as well as a current difference ΔIq1 between the q-axis value Iq*1 and the q-axis value Iq1 are calculated. The d-axis value Vd1 and the q-axis value Vq1 are calculated to reduce the current differences ΔId1 and ΔIq1 to zero, so that the d-axis value Id1 and the q-axis value Iq1 follow the d-axis value Id*1 and the q-axis value Iq*1, respectively. As three-phase command voltage values, a U-phase command voltage value Vu*1, a V-phase command voltage value Vv*1 and a W-phase command voltage value Vw*1 are calculated based on the command voltage values Vd1, Vq1 and the rotor rotation position θ.

As duty command signals, a U-phase duty value Du1, a V-phase duty value Dv1 and a W-phase duty value Dw1 are calculated based on the three-phase voltage command values Vu*1, Vv*1, Vw*1 and a capacitor voltage Vc. The calculated duty values Du1, Dv1 and Dw1 are stored in registers. The duty command signals having the respective duty values Du1, Dv1 and Dw1 are compared with a PWM reference signal by the pre-driver 62. The FETs 21 to 26 are turned on and off to control the currents supplied to the coils 11 to 13 by the pre-driver 62 based on the comparison results.

Figure 3:
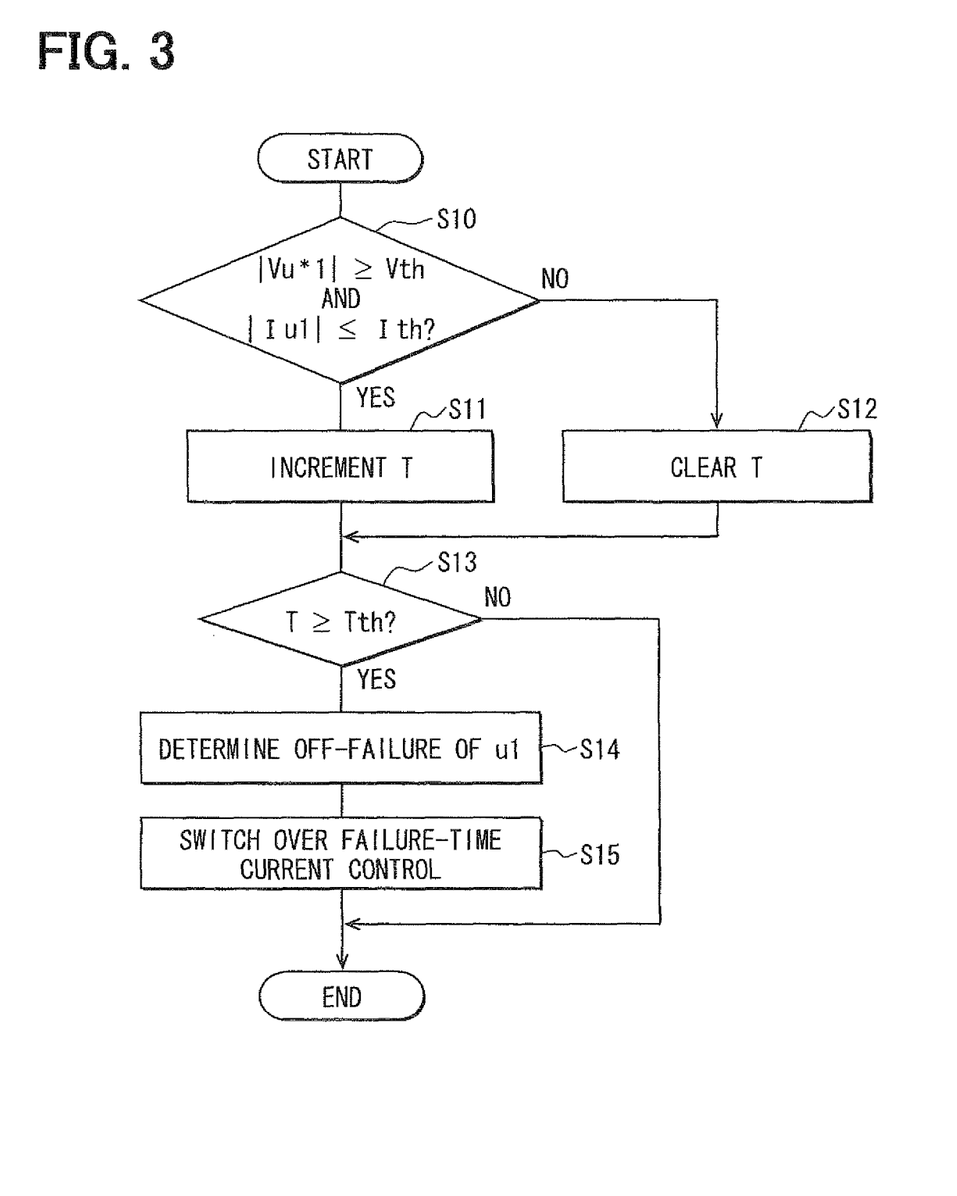
FIG. 3 is a flowchart showing failure determination processing executed in the first embodiment.

The first embodiment is configured to perform characteristic control in case of an off-failure in any one of FETs 21 to 26 and 31 to 36. The off-failure indicates that a FET is persistently turned off and cannot be turned on. The characteristic control is described with reference to the off-failure in the U1 low-side FET 24 as an example. The other FETs are controlled similarly in case of respective off-failures. First, identification of a failing switching element pair, which is in the off-failure, among the FETs 21 to 26 and 31 to 36, is described with reference to FIG. 3. FIG. 3 is an example of the identification processing with respect to the U1 switching element pair 27, which is a switching part. This identification processing is performed for each of the switching element pairs 27 to 29 and 37 to 39 in parallel at a predetermined interval (for example, 5 ms) when the motor rotation speed ω is lower than a predetermined rotation speed.

At step 10 (S10), it is checked whether the absolute value of the U1-phase command voltage value Vu*1 is equal to or greater than a threshold voltage (first predetermined value) Vth and the current value Iu1 of the U1 coil 11 is equal to or less than a threshold current (second predetermined value) Ith. The second predetermined value Ith is set to be close to 0 to detect that no current flows in the U1 coil 11. A measurement error and the like are taken in setting the second predetermined value Ith. If the absolute value of the U1-phase command voltage value Vu*1 is equal to or greater than the first predetermined value and the current value Iu1 of the U1 coil 11 is equal to or less than the second predetermined value (S10: YES), that is, no current flows in the U1 coil 11 even when the voltage is applied thereto, S11 is executed. If the absolute value of the U1-phase command voltage value Vu*1 is less than the first predetermined value or the current value Iu1 of the U1 coil 11 is greater than the second predetermined value (S10: NO), S12 is executed.

At S11, a count indicating an abnormality continuation period T is incremented. At S12, the count indicating the abnormality continuation period T is cleared to 0 (reset).

Following S11 or S12, it is checked at S13 whether the abnormality continuation period T is equal to or longer than a threshold period (third predetermined value) Tth. The third predetermined value Tth may be set within an allowable range, which will not cause any critical problems in the vehicle operation. If the abnormality continuation period T is shorter than the third predetermined value (S13: NO), no more step is executed. If the abnormality continuation period T is equal to or longer than the third predetermined value (S13: YES), S14 is executed.

At S14, the U1 switching element pair 27 is determined to be in the off-failure. That is, at least one of the FETs 21 and 24 of the U1 switching element pair 27 is in the off-failure, when the current value of the U1 coil 11 continues to be less than the second value for more than the third predetermined value under the condition that the U1 command voltage value Vu*1, the absolute value of which is equal to or greater than the first predetermined value, is continuously applied. The pair 27 is thus a failing switching part. At S15, the control of the first inverter part 20 including the U1 switching element pair 27 is switched over to a failure-time current control so that the first inverter part 20 is controlled based on failure-time phase current command values. The first inverter part 20 is thus a failing inverter part.

The failure-time control according to the phase current command value is performed as described below. The output power of the motor 10 is defined by the following expression. In the following expression, Tm [Nm] indicates a motor torque, and ω [rad/s] indicates a rotor rotation speed. Eu, Ev, Ew indicate induced voltages of U, V, W phases, respectively. Iu, Iv, Iw indicate currents of U, V, W phases, respectively.

$$Tm \times \omega = Eu \times Iu + Ev \times Iv + Ew \times Iw \quad (1)$$

The phase current, which flows in the normal time (not failure-time), is expressed as follows with Im [A] indicating a maximum magnitude of a phase current.

$$Iu = Im \times \sin \theta \quad (2)$$

$$Iv = Im \times \sin\{\theta - (2/3)\pi\} \quad (3)$$

$$Iw = Im \times \sin\{\theta(4/3)\pi\} \quad (4)$$

The induced voltage is expressed as follows with Ke [V/(rad/s)] indicating a constant of counter electromotive force and θ [rad] indicating an electric angle of the motor 10.

$$Eu = Ke \times \omega \times \sin \theta \quad (5)$$

$$Ev = Ke \times \omega \times \sin\{\theta - (2/3)\pi\} \quad (6)$$

$$Ew = Ke \times \omega \times \sin\{\theta - (4/3)\pi\} \quad (7)$$

The following expression is acquired with Kt [Nm/A] indicating a constant of torque and Iq [A] indicating the q-axis current.

$$Tm = Kt \times Iq \quad (8)$$

$$Iq = K1 \times Im \quad (9),$$

wherein K1 is the square root of 3/2.

Since the motor 10 is the three-phase brushless motor, the following relation holds according to Kirchhoff's laws.

$$Iu + Iv + Iw = 0 \quad (10)$$

The following relation also holds between the constant of counter electromotive force Ke and the constant of torque Kt.

$$Kt = K1 \times Ke \quad (11)$$

In case that the U1 switching element pair 27 fails, no current flows in the U1 coil 11. Therefore, the following expression (12) is acquired by substituting the expressions (5) to (7) into the expression (1), while setting Iu to 0 (Iu=0) and Iv to −Iw (Iv=−Iw) from the expression (10).

$$Tm \times \omega = [Ke \times \omega \times \sin\{\theta - (2/3)\pi\}] \times Iv +$$
$$[Ke \times \omega \times \sin\{\theta - (4/3)\pi\}] \times (-Iv)$$
$$= (Ke \times \omega \times K2 \times \cos\theta) \times Iv,$$

wherein K2 is the square root of 3.

That is, $Iv = Tm/(K2 \times Ke \times \cos \theta)$ (12)

The following expression (13) is acquired by substituting the expressions (8) and (11) into the expression (12).

$$Iv = Kt \times Iq/(K2 \times Ke \times \cos\theta) \quad (13)$$
$$= K1 \times Ke \times Iq/(K2 \times Ke \times \cos\theta)$$
$$= Iq/(K3 \times \cos\theta),$$

wherein K3 is the square root of 2.

Since the U1 low-side FET 24 of the U1 switching element pair 27 is assumed to be in failure, the other two pairs, that is, the V1 switching element pair 28 and the W1 switching element pair 29, are controlled based on the failure-time phase current command values in the first inverter part 20, which is the failing inverter part.

Here, the q-axis current command value is Iq*1 the maximum phase current value is Imax and the minimum phase current value is −Imax. The V1-phase current command value Iv1ref of the V1 coil 12 and the W1-phase current command value Iw1ref of the W1 coil 13 are calculated by the following expressions, which are functions of the q-axis value Iq*1 and the rotor rotation position θ based on the expression (13).

$$Iv1ref = Iq*1/(K3 \times \cos \theta), (-Imax \leq Iv1ref \leq Imax) \quad (14)$$

$$Iv1ref = Imax \ (Iv1ref > Imax) \quad (15)$$

$$Iv1ref = -Imax \ (Iv1ref < -Imax) \quad (16)$$

$$Iw1ref = -Iv1ref \quad (17)$$

Iv1ref and Iw1ref calculated based on the expressions (14) to (17) are failure-time phase current command values.

Figure 4A:
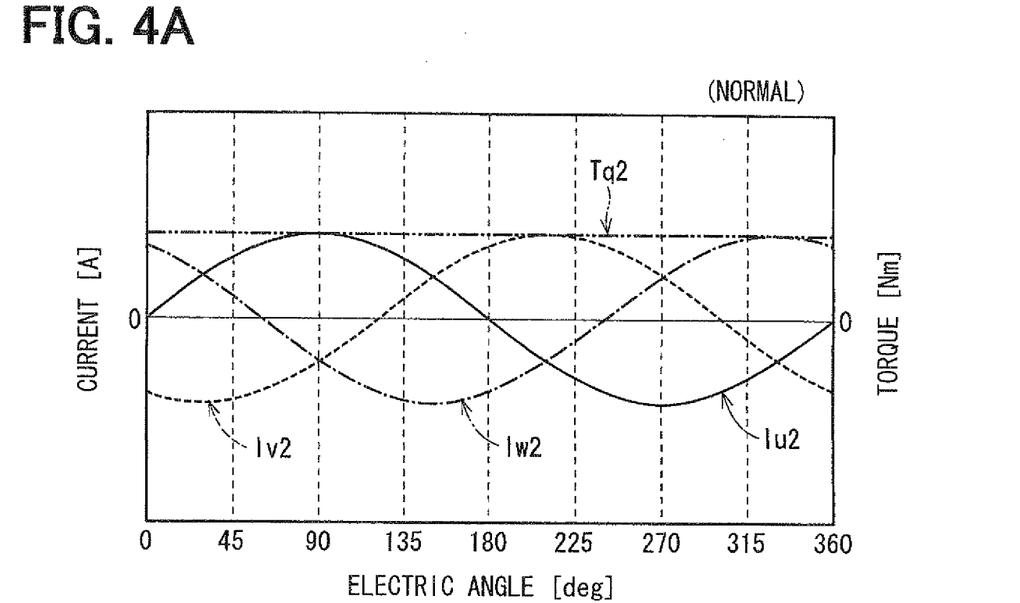
FIGS. 4A and 4B are graphs showing phase currents and motor torques produced by a normal inverter and a failing inverter, respectively, in the first embodiment.
Figure 4B:
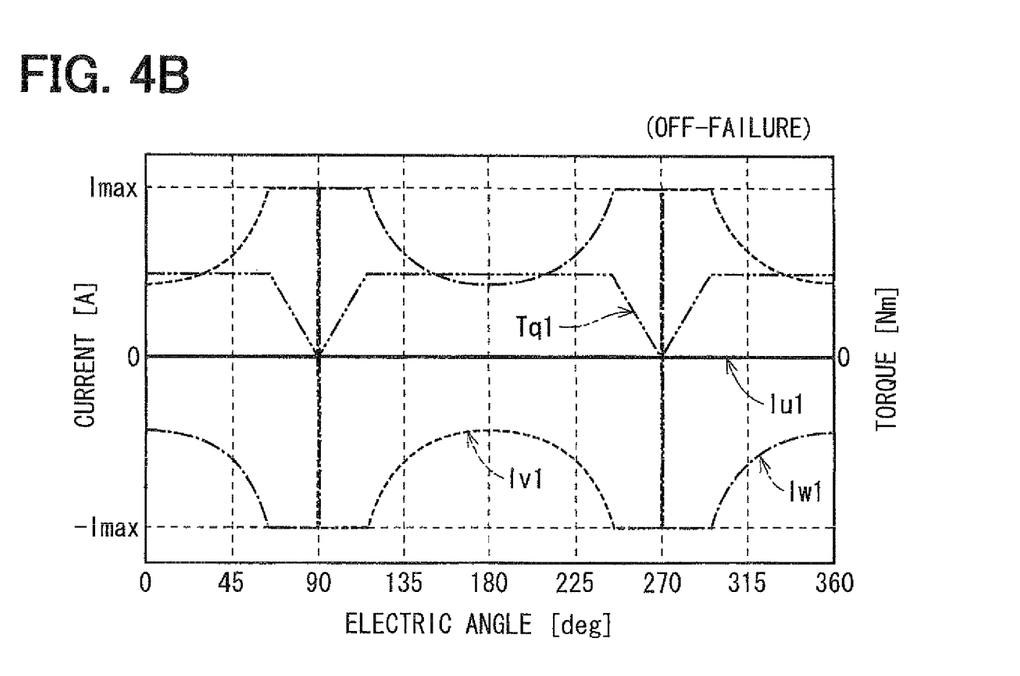

When the failure-time control is performed in the case of the off-failure of the U1 low-side FET 24 of the U1 switching element pair 27, the phase current I and the motor torque Tq change as shown in FIGS. 4A and 4B. The U-phase current Iu, the V-phase current Iv and the W-phase current Iw are shown by a solid line, a broken line and a one-dot chain line, respectively. The torque Tq generated by the current supply is shown by a two-dot chain line.

Specifically, FIG. 4A show three-phase currents Iu2, Iv2 and Iw2, which are supplied when the normal PWM control is performed in the second inverter part 30, which is a normal inverter part. FIG. 4A also shows a torque Tq2, which is generated when the coils 14 to 16 are supplied with such currents. In the normal control, the FETs 31 to 36 are turned on and off so that the three-phase currents Iu2, Iv2 and Iw2 are supplied to the coils 14 to 16 in sine waveforms, which are shifted by an electric angle of 120°, respectively. The torque Tq2 thus generated by the second coil set 19 is substantially the same with respect to the electric angle.

The FET 24 in the first inverter part 20 is assumed to be in failure and corresponds to the failing inverter part. The coil 11 connected to the FET 24 is not supplied with any current (Iu1=0) as shown in FIG. 4B, and hence no sine-wave currents are supplied as opposed to the sine-wave currents shown in FIG. 4A. However, the FETs 22, 25 of the V1 switching element pair 28 and the FETs 23, 26 of the W1 switching element pair 29 are turned on and off based on the failure-time phase current command values Iv1ref and Iw1ref calculated by the expressions (14) to (17). As a result, the three-phase currents Iu1, Iv1, Iw1 supplied to the coils 11 to 13 change as shown in FIG. 4B.

The torque Tq1 is not generated (Tq1=0) by the first coil set 18 at the electric angles of 90° and 270°. A similar torque is generated as in the case of normal PWM control, during a certain interval, in which the absolute value of Iv1ref is less than the absolute value |Imax|, which is the absolute value of the maximum phase current value Imax or the absolute value of the minimum phase current value −Imax.

Figure 5:
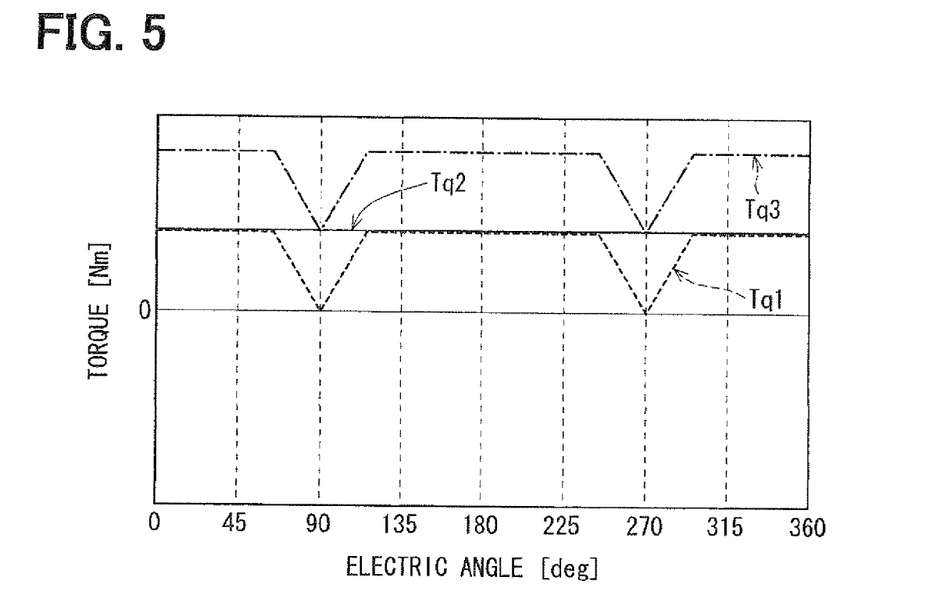
FIG. 5 is a graph showing a motor torque generated by the motor in the first embodiment.

Thus, the motor 10 generates its total torque Tq3 as shown in FIG. 5 by the current supply to the first coil set 18 and the second coil set 19. It is noted that the torque Tq2 generated by the second coil set 19 is substantially the same with respect to the electric angles as indicated by the solid line. As indicated by the broken line, the torque Tq1 is not generated (Tq1=0) by the first coil set 18 at the electric angles of 90° and 270°. A similar torque is generated as the torque Tq2 is generated by the second coil set 19, during a certain interval, in which the absolute values of the failure-time phase current command values Iv1ref and Iw1ref are less than the absolute value of the maximum phase current value |Imax|.

As shown by the one-dot chain line, the total torque Tq3 corresponding to a sum of the torque Tq1 generated by the first coil set 18 and the torque Tq2 generated by the second coil set 19 never falls to zero at any electric angles. Substantially the same torque is generated as in the normal case, as long as the absolute values of the failure-time phase current command values Iv1ref and Iw1ref are less than the absolute value of the phase current maximum value |Imax|.

It is noted that the similar control is performed in case of the off-failure of any FETs other than the U1 low-side FET 24. If the FET in other phases fails, the torque is not generated at different electric angles. The two electric angles, at which no torque is generated, are shifted by an electric angle of 180° from each other.

As described above, the control part 60 includes the failure identification part and the failure-time control part. The failure identification part identifies, if the U1 low-side FET 24 is in the off-failure, under which the FET 24 is disabled from being turned on, the U1 switching element pair 27 as the failing switching part. This failure may be detected based on the current, which flows in the current detection part 41, because no current will flow upon failure of the FET 24. The failure-time control part of the control part 60 calculates the failure-time phase current command values Iv1ref and Iw1ref based on the expressions (14) to (17), which are functions of the rotor rotation position θ and the q-axis value Iq*1. The failure-time control part of the control part 60 controls the V1 switching element pair 28 and the W1 switching element pair 29 in the first inverter part 20, which includes the U1 switching element pair 27 identified as the failing switching part, based on the failure-time phase current command values Iv1ref and Iw1ref, respectively. The failure-time control part controls the second inverter part 30 in the normal manner, that is, differently from the first inverter part 20.

According to the first embodiment, a plurality of inverter parts 20 and 30 is provided. Even when the U1 low-side FET 24 of the first inverter part 20 fails, the second inverter part 30, which does not include the U1 low-side FET 24, is controlled in the normal manner. As a result, the motor 10 is driven to generate a torque at any time. The failure-time phase current command values Iv1ref and Iw1ref are calculated as the function of the rotor rotation position θ and the q-axis current command value Iq*1. The first inverter part 20 is driven by using the switching element pairs 28 and 29 based on the failure-time phase current command values Iv1ref and Iw1ref. The first coil set 18 is thus continuously supplied with electric currents. As a result, the reduction of torque is minimized. The similar control is performed, when any other FET fails to turn on because of its off-failure. Specifically, the switching element pairs in one inverter part, which are not in the off-failure, are controlled based on the failure-time phase current command values calculated by setting current of the coil corresponding to the failing switching element pair. The other inverter part, which includes no failing switching element pair, is controlled normally. Thus, even when the off-failure arises in any of the FETs 21 to 26 and 31 to 36, certain torque is continuously generated at any electric angles. Since the motor 10 is thus persistently driven with only a minimum torque reduction, it is possible to drive the motor 10 persistently and safely.

Further, according to the first embodiment, the failure-time phase current command values Iv1ref and the Iw1ref are calculated as the function of the rotor rotation position θ and the q-axis current command value Iq*1. The torque generation can be controlled more precisely in comparison with a case, in which the phase current command values are pre-stored as a data table in a memory, in a period, in which the absolute values of the failure-time phase current command values Iv1ref and Iw1ref are less than the absolute value of the maximum phase current value |Imax|. In addition, the capacity of the memory part and hence the size and cost of the entire device can be reduced.

The U1 switching element pair 27 is determined to be in the off-failure by the failure identification part, when it is determined that the command voltage value for the U1 switching element pair 27 is equal to or greater than the predetermined value and no current flows in the U1 coil 11 corresponding to the U1 switching element pair 27. The off-failure is thus readily specified based on the relation between the command voltage value for the U1 coil 11 and the actual current flow state of the U1 coil 11. The off-failure of other switching element pairs 28, 29, 31 to 39 can be checked and determined in the similar manner.

Second Embodiment

According to the second embodiment, the multi-phase motor control apparatus 1 is configured similarly as in the first embodiment. However, the control part 60 is configured to perform the failure-time control as shown in FIG. 6.

Figure 6:
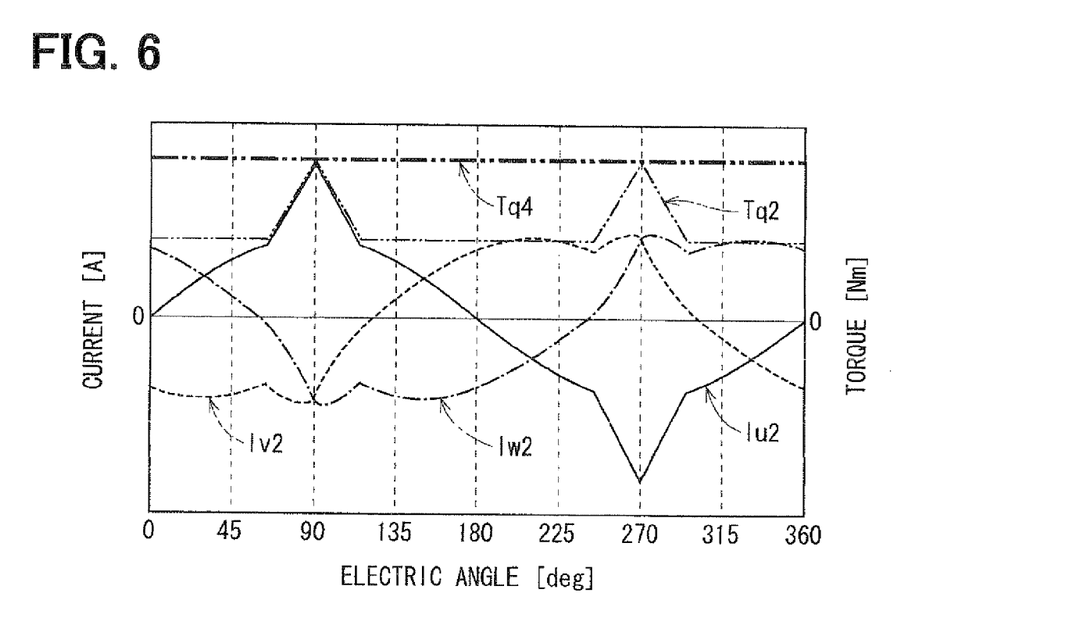
FIG. 6 is a graph showing a phase current and a motor torque produced by a normal inverter in a second embodiment.

In FIG. 6, the failure-time control is shown with respect to the off-failure of the U1 low-side FET 24 in the first inverter 20 as an example. The three-phase currents Iu1, Iv1, Iw1 supplied to the first coil set 18 and the generated torque Tq1 are the same as FIG. 4B. In the first embodiment, as shown in FIG. 5, the total torque Tq3 decreases at two electric angles in correspondence to the decrease of torque Tq1 in the first coil set 18. In the second embodiment, therefore, the second inverter part 30 is also controlled to compensate for the torque decrease in the first coil set 18.

According to the second embodiment, a torque difference between two torques is calculated. One torque is generated when the first inverter part 20 is controlled normally with the U1 low-side FET 24 being not in the off-failure. The other torque is generated when the first inverter part 20 is controlled based on the failure-time phase current command values Iv1ref and Iw1ref calculated by expressions (14) to (17) with the U1 low-side FET 24 is in the off-failure. The second inverter part 30 is controlled by correcting the q-axis current command value Iq*2 in the second inverter part 30. As a result, the current Iu2 supplied to the U2 coil 14, the current Iv2 supplied to the V2 coil 15 and the current Iw2 supplied to the W2 coil 16 are changed as indicated by the solid line, the broken line and the one-dot chain line in FIG. 6, respectively. In this case, as shown by the two-dot chain line in FIG. 6, the torque Tq2 generated by the current supply to the second coil set 19 compensates for the torque decrease, which arises at around the electric angles 90 degrees and 270 degrees. The total torque Tq4, which is the sum of the torque Tq1 (FIG. 4A) generated by the first coil set 18 and the torque Tq2 generated by the second coil set 19 are substantially the same at any electric angles. Thus, substantially the same torque is generated as in the case that all the FETs 21 to 26 and 31 to 36 are normal.

According to the second embodiment, the torque decrease caused by the failure of the U1 low-side FET 24 is suppressed by controlling the second inverter part 30, which is the normal inverter part, to compensate for the torque decrease. Since the motor 10 is persistently driven by switching element pairs 28 and 29 in the first inverter part 20, the torque generated by the first coil set 18 is decreased only in intervals around the electric angles of 90° and 270°. Generally the same torque is generated in other intervals of electric angles as in the normally operating case. Even when the second inverter part 30 is thus controlled to compensate for the torque decrease caused by the failure of the U1 low-side FET 24, the amount of heat generated is less in comparison to the case, in which the first inverter part 20 is entirely disabled to operate. As a result, generally the same torque is generated without remarkably changing the size of the inverter parts 20 and 30.

The present invention is not limited to the disclosed embodiments but may be implemented in other different forms.

(a) Current Detection Parts

The current may be detected by the current detection parts 41 to 43 at a variety of positions as exemplified in FIGS. 7A to 7E. Only the FETs 21 to 26 of the first inverter part 20 and the first coil set 18 controlled by the first inverter part 20 are shown in FIGS. 7A to 7E. The FET 200 of the first inverter part 20, the second coil set 19, the control part 60 and the like are not shown. The current detection parts 41 to 43 may also be provided in the second inverter part 20 in the similar manner as in the first inverter part 20. The current detection parts 41 to 43 may be provided at different positions between the first inverter part 20 and the second inverter part 30.

Figure 7A:
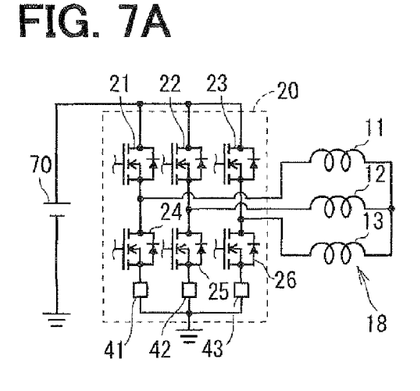
FIGS. 7A to 7E are circuit diagrams showing current sensors used in a variety of locations.
Figure 7B:
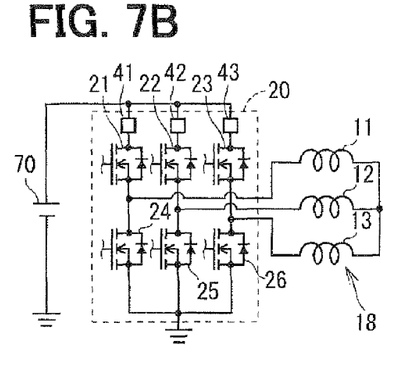
Figure 7C:
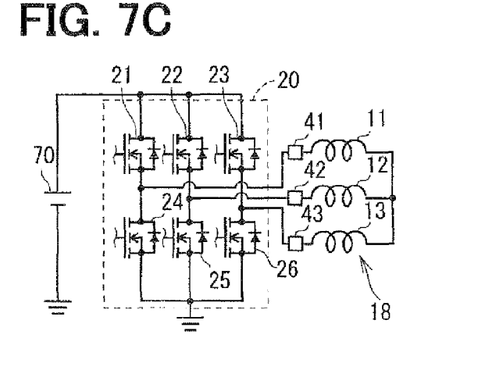

The arrangement shown in FIG. 7A is the same as in FIG. 1. That is, In FIG. 7A, the current detection parts 41, 42, 43 are connected between the low-side FETs 24, 25, 26 and the ground, respectively. In FIG. 7B, the current detection parts 41, 42, 43 are connected between the high-side FETs 21, 22, 23 and the power source 70 side, respectively. In FIG. 7C, the current detection part 41 is connected between a junction of the FETs 21, 24 and the U1 coil 11. The current detection part 42 is connected between a junction of the FETs 22, 25 and the V1 coil 12. The current detection part 43 is connected between a junction of the FETs 23, 26 and the W1 coil 13. In case of FIG. 7C, the current detection parts 41, 42, 43 preferably use Hall elements in place of shunt resistors.

In FIGS. 7A to 7C, one of the plurality (n-phase) of current detection parts may be obviated, because the currents of all phases can be detected from Kirchoff's Law (I1+I2+I3+ - - - +In=0).

Figure 7D:
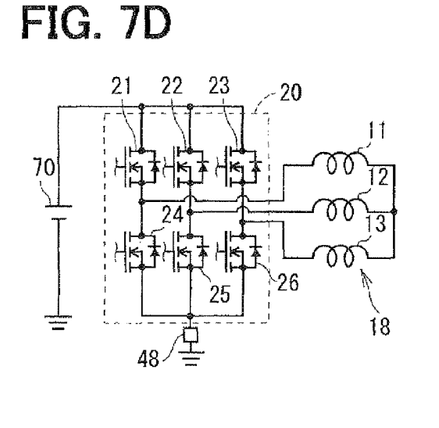
Figure 7E:
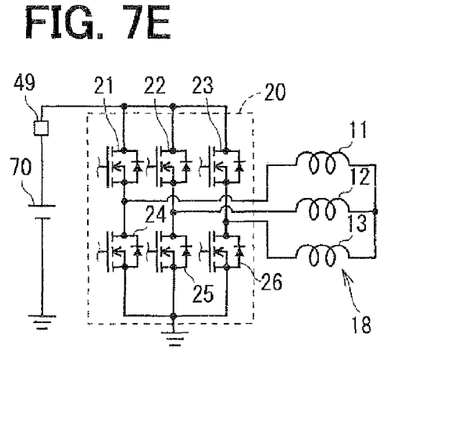

In FIG. 7D, only one current detection part 48 is connected between a junction of all low-side FETs 24, 25, 26 and the ground. In FIG. 7E, only one current detection part 49 is connected between a junction of all high-side FETs 21, 22, 23 and the power source 70. In case of detecting the current at only one position as shown in FIGS. 7D and 7E, the currents of all phases are detected by appropriately setting the detection time points in correspondence to the switching of current supply to the coils 11, 12, 13.

(b) Other Implementations

In the foregoing embodiments, the failure-time phase current command values are calculated based on a function defined in accordance with the rotor rotation position 8 and the q-axis current command value Iq. With the q-axis current Iq, the motor generation torque Tm and a proportional constant K, the following expression holds.

$$Tm = K \times Iq \qquad (18)$$

That is, the torque generated by the motor is proportional to the q-axis current. It is therefore possible to express the expressions (14) to (17), which are used to calculate the failure-time phase current command values in the foregoing embodiments, by using the torque command values. That is, the failure-time phase current command values may be calculated as a function of a motor torque command value and a rotor rotation angle.

The foregoing embodiments may be modified to be applied to a multi-phase rotary machine as a replacement of the motor. The multi-phase rotary machine may also be a drive power motor of a hybrid vehicle, a power window motor or the like.

What is claimed is:

1. A control apparatus for a multi-phase rotary machine including a stator, a rotor and a shaft, the stator being wound with a plurality of coil sets each including coils of a plurality of phases, the rotor being rotatable relative to the stator and the shaft being rotatable with the rotor, the control apparatus comprising:

a plurality of inverter parts provided in correspondence to the plurality of coil sets, each inverter part including a plurality of switching parts in correspondence to each coil set;

a rotation position detection part for detecting a rotation position of the rotor;

a current detection part for detecting a current supplied to each of the coils; and a control part for turning on and off the switching parts thereby to control each current supplied to the coils, wherein the control part includes a failure identification part for identifying a failing switching part, which has an off-failure, when the switching part is disabled to turn on, wherein the control part includes a failure-time control part for controlling, in a failing inverter part including the failing switching part, other switching parts different from the failing switching part based on a failure-time phase current command value calculated as a function of the rotation position and a torque command value or a function of the rotation position and a q-axis current command value, while operating a normal inverter part other than the failing inverter part; and the failure-time control part calculates a torque difference and controls the normal inverter part by correcting a q-axis current command value of the normal inverter part based on the torque difference, the failure-time control part calculating the torque difference from a normal torque generated when the switching part has no failure and a normal, control is performed and a failure-time torque generated when the switching part has the off-failure and a failure-time control is performed based on the failure-time current command value.

2. The control apparatus according to claim 1, wherein:
the failure identification part determines the off-failure of the switching part, when an absolute value of a command voltage for the switching part is greater than a predetermined value and the current is not supplied to the coil corresponding to the switching part.

3. The control apparatus according to claim 1, wherein:
the multi-phase rotary machine is provided in an electric power steering system.

4. A control apparatus for a multi-phase rotary machine including a stator, a rotor and a shaft, the stator being wound with a plurality of coil sets each including coils of a plurality of phases, the rotor being rotatable relative to the stator and the shaft being rotatable with the rotor, the control apparatus comprising:
 a plurality of inverter parts provided correspondence to the plurality of coil sets, each inverter part including a plurality of switching parts in correspondence to each coil set;
 a rotation position detection part for detecting a rotation position of the rotor,
 a current detection part for detecting a current supplied to each of the coils; and
 a control part for turning on and off the switching parts thereby to control each current supplied to the coils,
wherein the control part includes a failure identification part for identifying a failing switching part, which has an off-failure, when the switching part is disabled to turn on,
wherein the control part includes a failure-time control part for controlling, in a failing inverter part including the tailing switching part, other switching parts different from the failing switching part based on a failure-time phase current command value calculated as a function of the rotation position and a torque command value or a function of the rotation position and a q-axis current command value, while operating a normal inverter part other than the failing inverter part; and
the failure-time control part controls the normal inverter part irrespective of a torque difference between a normal torque, which is generated when the switching part has no failure and a normal control is performed, and a failure-time torque, which is generated when the switching part has the off-failure and a failure-time control is performed based on the failure-time current command value.

* * * * *